(12) United States Patent
Pruitt et al.

(10) Patent No.: US 7,798,272 B2
(45) Date of Patent: Sep. 21, 2010

(54) SYSTEMS AND METHODS FOR CONTROLLING SLIP OF VEHICLE DRIVE MEMBERS

(75) Inventors: Randall D. Pruitt, Washington, IL (US); Igor Strashny, Grenoble (FR)

(73) Assignee: Caterpillar Inc, Peoria, IL (US)

( * ) Notice: Subject to any disclaimer, the term of this patent is extended or adjusted under 35 U.S.C. 154(b) by 147 days.

(21) Appl. No.: 11/606,201

(22) Filed: Nov. 30, 2006

(65) Prior Publication Data

US 2008/0128189 A1   Jun. 5, 2008

(51) Int. Cl.
B60K 28/16 (2006.01)
(52) U.S. Cl. .................. 180/197; 180/307; 180/308
(58) Field of Classification Search .................. 180/197, 180/307, 308
See application file for complete search history.

(56) References Cited

U.S. PATENT DOCUMENTS

| | | |
|---|---|---|
| 3,295,620 A | 1/1967 | Messenger |
| 3,667,225 A | 6/1972 | Karman |
| 3,795,107 A | 3/1974 | Ward |
| 3,862,668 A | 1/1975 | Ward |
| 3,872,669 A * | 3/1975 | Ward .................. 60/395 |
| 3,917,014 A | 11/1975 | Ward |
| 4,139,987 A | 2/1979 | Budzich |
| 4,399,653 A | 8/1983 | Pylat, Jr. |
| 4,487,109 A | 12/1984 | Burandt et al. |
| 4,655,689 A | 4/1987 | Westveer et al. |
| 4,699,021 A | 10/1987 | Waddington |
| 5,232,406 A | 8/1993 | Sato |
| 5,289,100 A | 2/1994 | Joseph |
| 5,325,933 A | 7/1994 | Matsushita |
| 5,390,759 A | 2/1995 | Gollner |
| 5,525,043 A | 6/1996 | Lukich |
| 5,564,519 A * | 10/1996 | Katoh et al. .................. 180/243 |
| 5,810,106 A | 9/1998 | McCoy |

(Continued)

FOREIGN PATENT DOCUMENTS

EP   1193152   4/2002

(Continued)

OTHER PUBLICATIONS

U.S. Appl. No. 11/067,271, filed Feb. 28, 2005.

(Continued)

*Primary Examiner*—Kevin Hurley
*Assistant Examiner*—Tashiana Adams
(74) *Attorney, Agent, or Firm*—Finnegan, Henderson, Farabow, Garrett & Dunner LLC (57) ABSTRACT

A system for controlling slip of vehicle drive members is disclosed. The system includes a power train including a plurality of drive members and a hydraulic transmission configured to supply torque to at least one of the drive members. A magnitude of the torque is related to fluid flow in the hydraulic transmission. The system further includes a controller configured to control the fluid flow in the hydraulic transmission. The controller is configured to receive a signal indicative of a steering command and a signal indicative of a parameter related to pressure in the hydraulic transmission. The controller is further configured to control slip of the at least one drive member based on the signal indicative of a steering command and the signal indicative of a parameter related to pressure.

20 Claims, 4 Drawing Sheets

U.S. PATENT DOCUMENTS

| | | |
|---|---|---|
| 5,948,029 A | 9/1999 | Straetker |
| 6,067,795 A | 5/2000 | Iino et al. |
| 6,138,782 A | 10/2000 | Anderson et al. |
| 6,164,402 A * | 12/2000 | Hastreiter .................. 180/243 |
| 6,202,783 B1 | 3/2001 | Taylor et al. |
| 6,321,866 B1 * | 11/2001 | Prohaska .................. 180/307 |
| 6,339,928 B1 | 1/2002 | Göllner |
| 6,347,517 B1 | 2/2002 | Sereni |
| 6,408,975 B1 | 6/2002 | Bishop et al. |
| 6,524,076 B2 | 2/2003 | Konishi |
| 6,644,429 B2 | 11/2003 | Evans et al. |
| 6,666,022 B1 * | 12/2003 | Yoshimatsu et al. ........... 60/413 |
| 6,684,636 B2 | 2/2004 | Smith |
| 6,686,713 B2 | 2/2004 | Desbiolles et al. |
| 6,921,109 B2 | 7/2005 | Hutchison et al. |
| 6,935,454 B1 | 8/2005 | Hauser et al. |
| 7,044,257 B2 * | 5/2006 | Kempf et al. ............... 180/305 |
| 7,044,259 B2 * | 5/2006 | Stoll et al. ................. 180/307 |
| 7,134,980 B2 * | 11/2006 | Kroppe ........................ 475/86 |
| 7,175,013 B2 * | 2/2007 | Burns et al. ............. 192/70.12 |
| 7,597,172 B1 * | 10/2009 | Kovach et al. .............. 180/305 |
| 2005/0167177 A1 | 8/2005 | Roethler et al. |
| 2006/0096799 A1 | 5/2006 | Tatsuno et al. |
| 2006/0191732 A1 * | 8/2006 | Lunzman et al. ............ 180/307 |
| 2006/0254268 A1 | 11/2006 | Yasuda et al. |
| 2008/0046158 A1 * | 2/2008 | Carey et al. ................... 701/51 |

FOREIGN PATENT DOCUMENTS

| | | |
|---|---|---|
| EP | 1561672 | 8/2005 |
| EP | 1582389 | 10/2005 |
| GB | 1 498 883 | 1/1978 |
| JP | 63-5121 | 1/1988 |
| JP | 7-329817 | 12/1995 |
| JP | 08-284840 | 10/1996 |
| WO | WO 01/38119 | 5/2001 |

OTHER PUBLICATIONS

English-language Abstract for JP 08-280840, Oct. 29, 1996.
English-language Abstract of JP 63-5121, Jan. 11, 1988.
English-language Abstract of JP 7-329817, Dec. 19, 1995.

* cited by examiner

SYSTEMS AND METHODS FOR CONTROLLING SLIP OF VEHICLE DRIVE MEMBERS

TECHNICAL FIELD

The present disclosure is directed to systems and methods for controlling vehicle drive members and, more particularly, to systems and methods for controlling slip of vehicle drive members.

BACKGROUND

Some conventional vehicles include a power source and a power train for transferring power to drive members. The power train often includes a transmission coupled to the drive members, which propel the vehicle. Some of those vehicles may include a system that limits the amount of torque transferred from the power source to the drive members in order, for example, to prevent excessive wear or failure of power train components that might occur under certain operating conditions. Such systems, however, may unduly inhibit the vehicle's performance, for example, when those operating conditions do not exist.

In particular, it may be desirable for some vehicles to be able to supply more torque to one or more of the drive members under certain operating conditions than might be permitted by systems that limit the amount of torque transferred from the power source to the drive members. For example, it may be desirable to supply more torque to one or more of the drive members as the vehicle is executing a turn. It may also be desirable to supply more torque to one or more of the drive members when the vehicle encounters a situation such as, for example, a steep incline. It may also be desirable to limit the slip of the one or more drive members, even under circumstances in which more torque is desirable.

One example of a vehicle including a steering control system that changes engine power output based on steering input is described in U.S. Pat. No. 6,138,782 ("the '782 patent") issued to Anderson et al. on Oct. 31, 2000. The '782 patent describes a steering control system for a tracked vehicle that includes an engine driven variable displacement steering pump, which drives a hydraulic motor. A control system senses steering wheel position, vehicle speed, engine speed and forward/reverse vehicle direction. As a function of these sensed inputs, a control signal is generated and is used to control the swashplate angle of an engine-driven variable displacement pump, which drives a steering motor, which, in turn, drives a differential track drive mechanism. The control system also determines a ratio of motor speed to vehicle speed and generates a powerboost signal when the ratio exceeds a threshold value. The powerboost signal is communicated to an engine controller, which causes the engine to increase its power output. This modifies the engine fuel delivery curve based on the steering system power requirement and increases the power available for turning the vehicle.

Although the vehicle described in the '782 patent includes a steering control system that provides increased power for turning the vehicle, the vehicle described in the '782 does not include a system or method for controlling slip of driving members of the vehicle.

The systems and methods disclosed herein may be directed to achieving one or more of the desires set forth above.

SUMMARY OF THE INVENTION

In one aspect, the present disclosure includes a system for controlling slip of vehicle drive members. The system includes a power train including a plurality of drive members and a hydraulic transmission configured to supply torque to at least one of the drive members. A magnitude of the torque is related to fluid flow in the hydraulic transmission. The vehicle further includes a controller configured to control the fluid flow in the hydraulic transmission. The controller is configured to receive a signal indicative of a steering command and a signal indicative of a parameter related to pressure in the hydraulic transmission. The controller is further configured to control slip of the at least one drive member based on the signal indicative of a steering command and the signal indicative of a parameter related to pressure.

According to another aspect, the disclosure includes a vehicle including a power train having a plurality of drive members and a hydraulic transmission configured to supply torque to at least one of the drive members. A magnitude of the torque is related to fluid flow in the hydraulic transmission. The vehicle further includes a controller configured to control the fluid flow in the hydraulic transmission. The controller is further configured to receive a signal indicative of a steering command and a signal indicative of a parameter related to pressure in the hydraulic transmission, and control slip of the at least one drive member based on the signal indicative of a steering command and the signal indicative of a parameter related to pressure.

According to a further aspect, the disclosure includes a method for limiting slip of drive members of a vehicle. The method includes receiving a signal indicative of a parameter related to pressure in a transmission of the vehicle and a signal indicative of a steering command of the vehicle. The method further includes controlling fluid flow in the transmission based on the signal indicative of a parameter related to pressure in the transmission and the signal indicative of a steering command, such that the slip of at least one of the drive members is limited.

DETAILED DESCRIPTION

Figure 1:
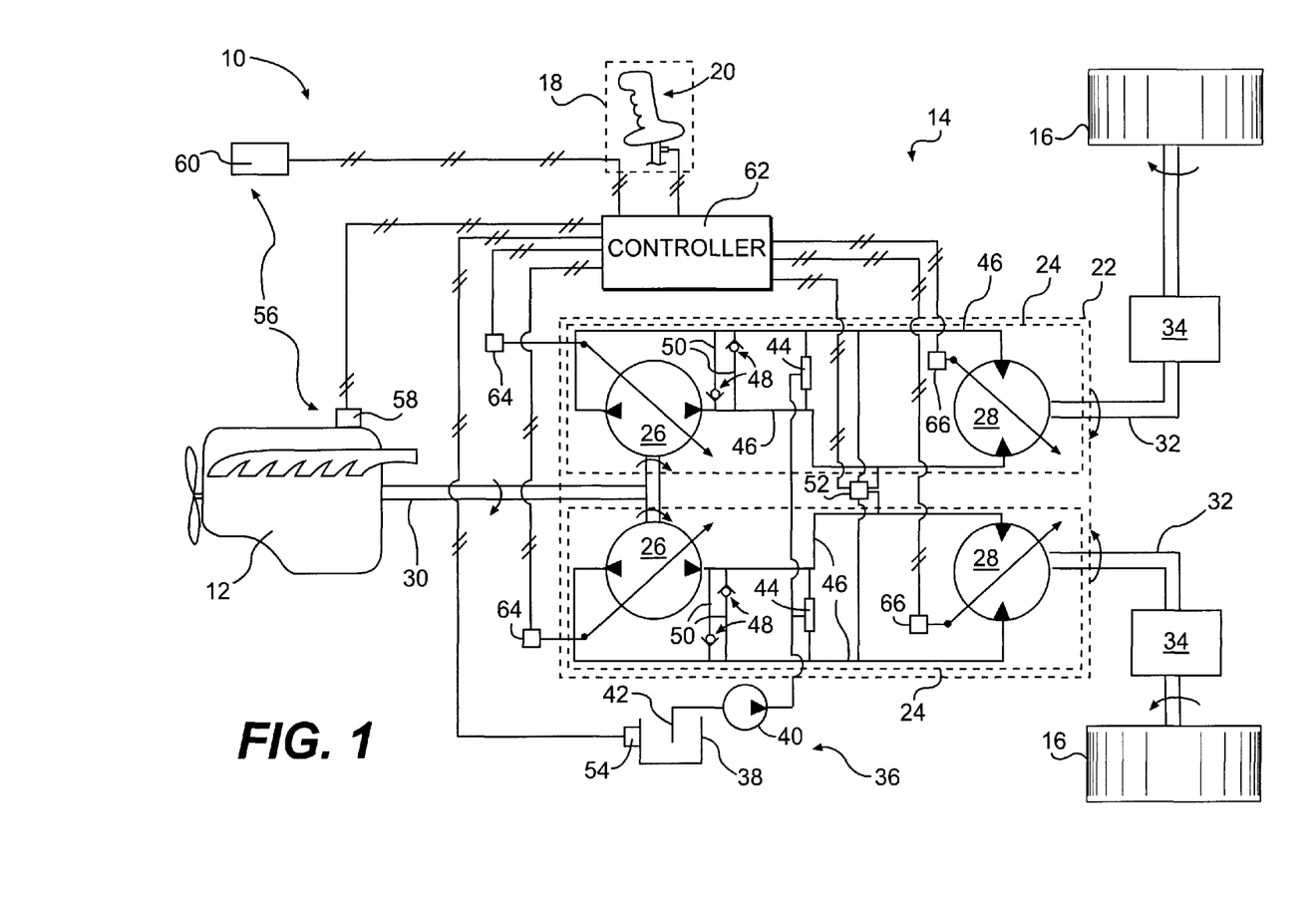
FIG. 1 is a schematic block diagram of an exemplary embodiment of a vehicle.

FIG. 1 schematically illustrates an exemplary embodiment of a vehicle 10. Vehicle 10 may include a power source 12 and a power train 14 operably coupling power source 12 to one or more drive members 16 configured to propel vehicle 10. Exemplary vehicle 10 further includes an operator interface 18, including one or more control devices configured to permit an operator to control the speed and direction of vehicle 10's path of travel. For example, operator interface 18 may include a steering device 20 configured to control the direction of travel of vehicle 10. FIG. 1 schematically depicts an exemplary steering device 20 including a single lever, but steering device 20 may be any device for use by an operator, either directly or remotely, for controlling the travel path of vehicle 10, such as, for example, one or more joy-sticks, one or more hand-operated or foot-operated levers, and a steering wheel. Operator interface 18 may further include a device for controlling vehicle speed (not shown).

Vehicle 10 may be any type of ground-borne vehicle, such as, for example, an automobile, a truck, an agricultural vehicle, and/or a construction vehicle, such as, for example, a wheel loader, a dozer, a track-type tractor, an excavator, a grader, an on-highway truck, an off-highway truck, and/or any other vehicle type known to a person skilled in the art. Moreover, power source 12 may be any device that generates power, such as, for example, an internal combustion engine, including but not limited to spark-ignition engines, compression ignition engines, rotary engines, gas turbine engines, and/or engines powered by gasoline, diesel fuel, bio-diesel, ethanol, methanol, and combinations thereof; hydrogen-powered engines; fuel cells; solar cells; and/or any other power source known to a person skilled in the art. Further, drive members 16 may include wheels, tracks, belts, tires, and/or any other device(s) for propelling a vehicle known to a person skilled in the art.

Power train 14 may include one or more transmissions 22 configured to operably couple power source 12 to drive members 16. For example, transmission 22 may be a hydraulic transmission, such as, for example, any transmission that uses fluid flow to transfer power between a power source and drive members. For example, transmission 22 may include a transmission that includes one or more hydraulically-operated clutches to transfer power, such as, for example, transmissions sometimes referred to as "manual" transmissions, which include a hydraulically-operated clutch to selectively connect and disconnect a power source to a gear train, and automatic transmissions that include hydraulically-operated clutches to selectively engage components of one or more planetary gear assemblies. Moreover, transmission 22 may be a continuously-variable transmission, such as, for example, a hydraulic transmission that includes a hydraulically-operated pump and a hydraulically-operated motor, sometimes referred to as a "hydrostatic" transmission.

Exemplary vehicle 10 shown in FIG. 1 includes two transmissions 22, each configured to supply power to one of drive members 16. For example, a track-driven vehicle such as a track-type tractor may include a separate hydrostatic transmission 24 for each drive member 16 (e.g., each track). A wheeled vehicle, such as a wheel loader, may include either a single hydrostatic transmission 24, which drives a pair of wheels, or it may include a separate hydrostatic transmission 24 for two or more of its four wheels.

As illustrated in FIG. 1, exemplary vehicle 10 may include a dual-path transmission configuration, which includes two hydrostatic transmissions 24. Each hydrostatic transmission 24 is operably coupled to power source 12, and includes a hydraulic pump 26 fluidly coupled to a hydraulic motor 28. Pump 26 and/or motor 28 may be variable displacement, variable delivery, fixed displacement, or any other configuration known in the art. Pump 26 is operably coupled to power source 12, for example, via an input shaft 30. Alternatively, pump 26 may be operably coupled to power source 12 via a torque converter (not shown), a clutch (not shown), a gear box (not shown), or in any other manner known in the art. Hydrostatic transmission 24 may also include an output shaft 32 operably coupling motor 28 to one of drive members 16 via, for example, a final drive 34. Final drive 34 may include a reduction gear arrangement, such as, for example, a bevel gear assembly, spur gear assembly, planetary gear assembly, and/or any other assembly known to those having skill in the art that provides a speed reduction.

Hydrostatic transmission 24 may be fluidly coupled to a hydraulic circuit 36. Hydraulic circuit 36 may include a reservoir 38 configured to supply hydraulic fluid to hydraulic circuit 36 via a charging pump 40 and a source line 42. Pump 26 may be configured to draw hydraulic fluid from reservoir 38, via source line 42, with the assistance of charging pump 40 and a shuttle valve 44. Pump 26 may be further configured to supply hydraulic fluid to hydraulic motor 28, along hydraulic lines 46. Hydraulic lines 46 may form a closed circuit in which one of hydraulic lines 46 carries fluid from pump 26 to motor 28, and other of hydraulic lines 46 return hydraulic fluid from motor 28 to pump 26. Hydraulic fluid flowing through motor 28 causes motor 28 to rotate, which results in supplying torque to output shaft 32. The direction of fluid flow in hydraulic circuit 36 may be reversible, such that output shaft 32 may be driven in two directions, thereby providing vehicle 10 with the ability to be driven in either a forward or reverse direction, perform pivot turns, and/or counter-rotate (i.e., operate such that drive members 16 on opposite sides of vehicle 10 rotate in opposite directions).

Hydrostatic transmission 24 may include cross-over relief (COR) valves 48 configured to relieve pressure within hydraulic lines 46 when pressure within hydraulic lines 46 exceeds a pressure limit. The pressure limit may be variable and/or may be adjustable, as discussed in more detail below. COR valves 48 may be configured to direct fluid from a side of hydraulic circuit 36 experiencing higher pressure to a side of hydraulic circuit 36 experiencing a lower pressure. For example, hydraulic fluid may be directed via a COR line 50 from one of hydraulic lines 46 (i.e., a hydraulic line experiencing higher pressure) to another of the hydraulic lines 46 that has a lower pressure.

Exemplary vehicle 10 may include one or more sensors configured to provide a signal indicative of a parameter related to pressure in the transmission 22. For example vehicle 10 may include a sensor 52 configured to provide a signal indicative of pressure in hydraulic circuit 36 and/or a sensor 54 configured to provide a signal indicative of temperature of the hydraulic fluid in hydraulic circuit 36. Vehicle 10 may also include one or more sensors related to the operation of power source 12, such as, for example, engine control sensors 56, which may include, for example, an engine speed sensor 58 and/or a throttle input sensor 60.

According to some exemplary embodiments, sensor 52 may be a fluid pressure sensor and may be provided in hydraulic circuit 36 at a location between pump 26 and motor 28. For example, a single pressure sensor 52 may be configured to determine a highest pressure of the hydraulic fluid at a location between multiple pumps and the hydraulic motors associated with each pump. Alternatively, each hydrostatic transmission 24 and/or each hydraulic line 46 located between the pump and motor of each hydrostatic transmission may include a separate pressure sensor.

According to some embodiments, sensor 54 may be a temperature sensor and may be configured to provide a signal indicative of the temperature of the hydraulic fluid in hydraulic circuit 36. For example, sensor 54 may be located anywhere within hydraulic circuit 36, such as, for example, within reservoir 30.

According to some embodiments, vehicle 10 may include a controller 62. As shown in FIG. 1, controller 62 may be configured to control operation of power source 12 and/or power train 14. For example, controller 62 may be configured to control transmission 22 by supplying control signals for operation of pumps 26 and motors 28. In particular, controller 62 may control fluid flow in transmission 22 by, for example, controlling displacement of pumps 26 and/or motors 28. In particular, transmission 22 may include a pair of pump actuator devices 64 (e.g., including solenoid and spool valve assemblies) configured to vary the displacement of pumps 26. Transmission 22 may further include a pair of motor actuator devices 66 (e.g., including solenoid and spool valve assemblies).

Controller 62 may control displacement of pumps 26 and motors 28 based on signals received from operator interface 18, sensor 52, sensor 54, and/or engine control sensors 56. Such signals may be in the form of digital, analog, mechanical, and/or hydraulic signals. For example, steering device 20 may provide a signal indicative of an operator's steering command that is received by controller 62. Further, sensor 52 may provide a signal indicative of a parameter related to pressure in hydraulic circuit 36, and/or sensor 54 may provide a signal indicative of the temperature of the hydraulic fluid in hydraulic circuit 36. One of more of these signals from sensor 52 and sensor 54 may be received by controller 62. Controller 62 may be configured to control fluid flow in transmission 22 based, at least in part, on the signals received from steering device 18 and one or more of sensors 52 and 54. By controlling the fluid flow, controller 62 may operate to control the magnitude of the power supplied to one or more of drive members 16.

For example, according to some embodiments, controller 62 may be configured to reduce the output of transmission 22 in response to sensor 52 and/or sensor 54. In particular, controller 62 may be configured to operate such that when the pressure and/or temperature measured in the hydraulic circuit 36 reaches a limit value or values, controller 62 reduces the stroke of pumps 26 and/or motors 28 (i.e., de-strokes pumps 26 and/or motors 28), so that pressure and/or temperature in the hydraulic circuit 36 does not exceed the limit value(s). According to some embodiments, the power output of transmission 22 may be dependent on a ratio between the displacement of pumps 26 and the displacement of motors 28, and controller 62 may be configured to control the ratio between the displacement of pumps 26 and the displacement of motors 28. As will be described in more detailed below, according to some embodiments, the limit value(s) may be variable and/or operator adjustable.

Controller 62 may include any components that may be used to run an application, such as, for example, a memory, a secondary storage device, and/or a central processing unit. According to some embodiments, controller 62 may include additional or different components, such as, for example, mechanical and/or hydro-mechanical components (see, e.g., the exemplary embodiment schematically-depicted in FIG. 2). Various other known components may be associated with controller 62, such as, for example, power supply circuitry, signal-conditioning circuitry, solenoid driver circuitry, and/or other appropriate circuitry. Such circuits may be electrical and/or hydro-mechanical.

Figure 2:
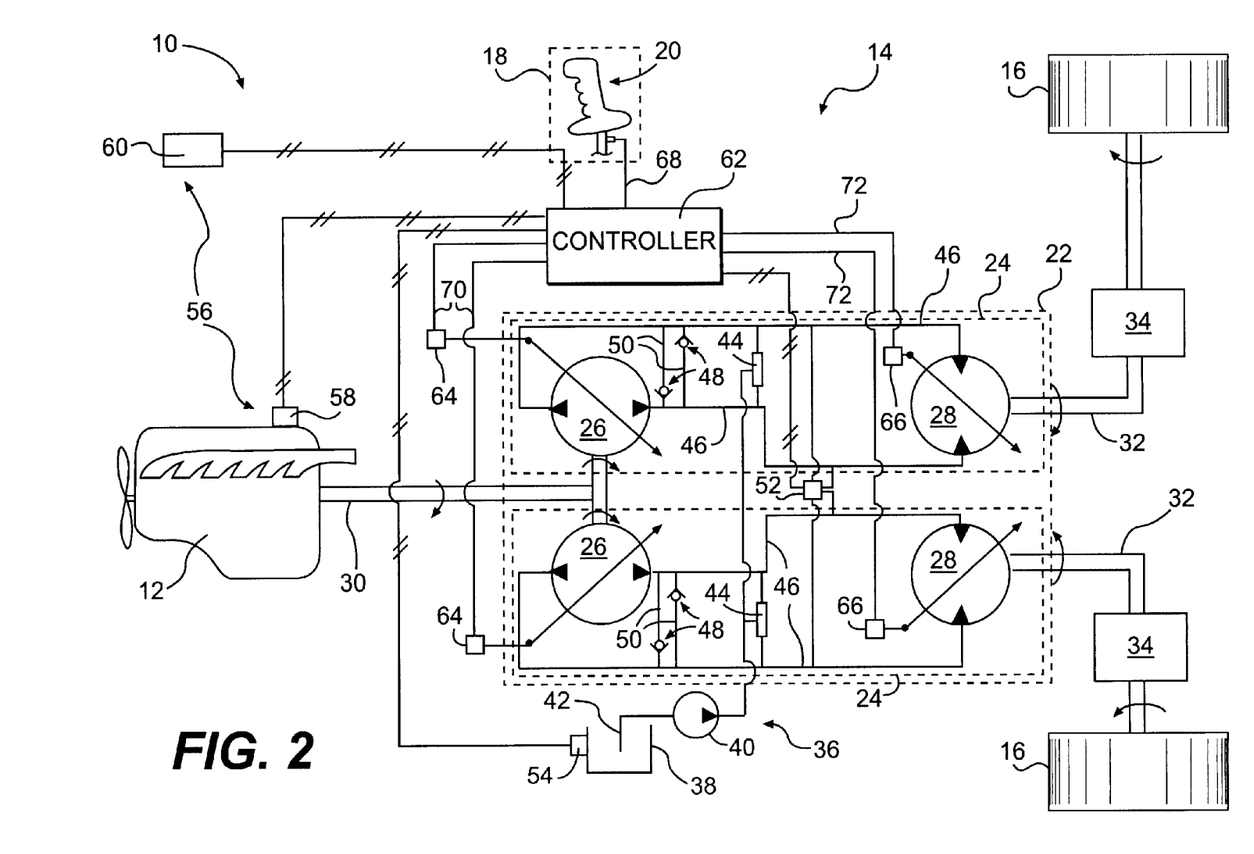
FIG. 2 is a schematic block diagram of another exemplary embodiment of a vehicle.

In the exemplary embodiment schematically depicted in FIG. 2, controller 62 includes hydro-mechanical control components. For example, steering device 20 includes one or more hydraulic valves and may be incorporated into a pilot hydraulic circuit (not shown). Steering device 20 may be fluidly coupled to controller 62 via a hydraulic line 68, such that hydraulic signals from steering device 20 are transmitted to controller 62. Controller 62 may be fluidly coupled to pump actuator devices 64 via hydraulic lines 70 and to motor actuator devices 66 via hydraulic lines 72, such that hydraulic signals are transmitted from controller 62 to pump and/or motor actuator devices 64 and 66, respectively.

Figure 3A:
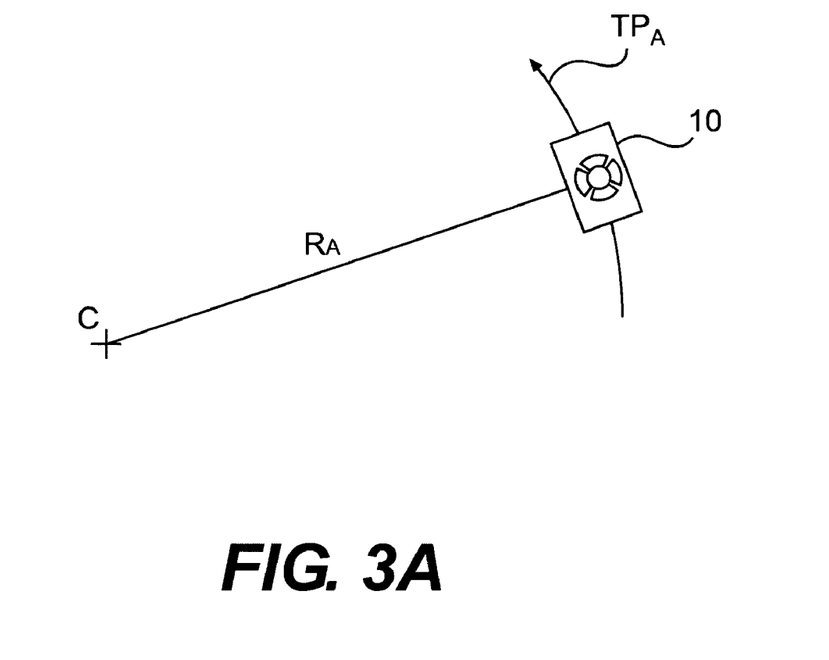
FIG. 3A is a schematic representation of an exemplary vehicle traveling along a curved travel path.
Figure 3B:
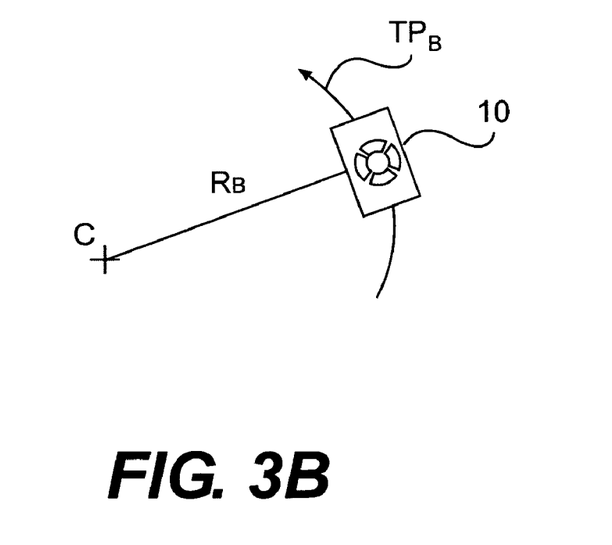
FIG. 3B is a schematic representation of an exemplary vehicle traveling along another example of a curved travel path.

According to some embodiments of vehicle 10, vehicle 10 may be controlled via operator interface 18, so that vehicle 10 is propelled via power source 12 and power train 14 in a straight-line travel path (not shown) and in curved travel paths, which curve to the right or left, for example, as schematically-depicted in FIGS. 3A and 3B. For example, power source 12 and/or transmissions 22 may be operated such that substantially equal amounts of power are supplied via transmissions 22 to drive members 16 on opposite sides of vehicle 10, thereby propelling vehicle 10 in a substantially straight-line travel path. Moreover, a transmission 22 located on one side of vehicle 10 may be operated to supply more power and/or force to its corresponding drive member 16 than a transmission 22 located on the opposite side of vehicle 10 supplies to its corresponding drive member 16. In this manner, vehicle 10 may be steered and propelled in a curved path, at a radius having a center on the same side of vehicle 10 as the drive member 16 that receives less power and/or force. Alternatively, or in addition, steering may be accomplished via pivoting of one or more drive members 16, for example, similar to a conventional automobile's front wheels. Further, vehicle 10 may alternatively, or additionally, include an articulated chassis (not shown), and steering may be executed via pivoting of the chassis at its point of articulation.

According to some embodiments, controller 62 is configured to control the amount of slip of one or more of drive members 16. For example, power source 12 may be capable of supplying sufficient power to overcome the traction of drive members 16. Once the traction of a drive member 16 is exceeded, the loss of traction may inhibit an operator's ability to sufficiently control vehicle 10, which may yield unsatisfactory operation in some situations.

The amount of traction capable of drive members 16 may depend on the operating environment of vehicle 10 and/or the type of operation being executed by vehicle 10. For example, vehicle 10 may be operated on a surface that inherently provides reduced traction, such as, for example, a wet surface and/or an unpaved surface. Further, the amount of traction of drive member 16 may be related to the amount of downward force applied to drive members 16. In particular, as more downward force is applied to a particular drive member 16, that drive member 16 may exhibit increased traction. Such an increase in downward force may occur, for example, when vehicle 10 is hauling a load or when vehicle 10 is a construction vehicle, such as a track-type tractor, which is pushing a pile of dirt with one side of its blade. In such instances, one or more of drive members 16 may exhibit greater traction due an increase in downward force.

Controller 62 may be configured to control the amount of slip of one or more of drive members 16, for example, by controlling the fluid flow in one or more of transmissions 22, such that the amount of torque supplied to the one or more drive members 16 is modulated to limit slip. For example, the torque supplied to drive member 16 may be controlled by controlling operation of pump 26 and/or motor 28. For example, the amount of torque supplied to drive member 16 may be controlled by, for example, by reducing the pressure and/or amount of fluid supplied to motor 28 (e.g., by de-stroking pump 26 (i.e., when pump 26 is a variable-displacement pump) and/or by, for example, de-stroking motor 28 (i.e., when motor 28 is a variable displacement motor). If power source 12 is supplying excess power to transmissions 22, such that drive members 16 lose traction and slip, controller 62 may operate to reduce the amount of torque transferred by transmissions 22 to drive members 16. In the exemplary embodiments shown in FIGS. 1 and 2, for example, controller 62 may send signals (e.g., either electric or hydraulic) to one or more of pump actuator devices 64 and/or one or more of motor actuator devices 66 to reduce the amount and/or pressure of fluid pumped via pumps 26 and/or de-stroke motors 28. By de-stroking motors 28, the amount of torque transferred from power source 12 to drive members 16 may be reduced. By reducing the amount of torque transferred, the amount of slip of one or more of drive members 16 may be reduced. According to some embodiments, for example, embodiments in which power source 12 is operably coupled to transmission 22 via a torque converter, the amount of slip may be controlled by limiting or reducing the operational speed of power source 12. This may, in turn, limit the amount of power transferred to drive members 16 via transmission 22 (i.e., an automatic transmission).

According to some embodiments, controller 62 may control the fluid flow in one or more of transmissions 22 based on signals indicative a steering command received from steering device 20 and/or a signal indicative of a parameter related to pressure received from sensor 52 and/or sensor 54. For example, controller 62 may include one or more memory devices for storing data, for example, in the form of one or more maps or tables, which correlate to values associated with the steering commands, values associated with the parameter related to pressure, values associated with vehicle 10's speed, values associated with a speed command, and/or values associated with the fluid flow in transmissions 22. Controller 62 may operate to determine appropriate fluid flow in transmissions 22 based these values and one or more of the maps or tables and provide a signal to one or more of pump and motor actuator devices 64 and 66, respectively, such that fluid flows in transmissions 22 according to the determined fluid flow. In this exemplary manner, controller 62 may operate to control the amount of power supplied to drive members 16.

According to some embodiments, controller 62 may include a processor configured to control fluid flow in one or more of transmissions 22 based on a mathematical relationship between, for example, a value corresponding to the signal indicative of a steering command and a value corresponding to the signal indicative of a parameter related to pressure in transmissions 22. According to such embodiments, the fluid flow in one or more of transmissions 22 may be controlled via real time calculations rather than, or in addition to, relying on values stored in maps or tables.

INDUSTRIAL APPLICABILITY

The disclosed systems and method for controlling slip of vehicle drive members may be applicable to any type of vehicle. For example, the disclosed systems and methods may be applicable to vehicles having one or more transmissions that include hydraulic components, for example, vehicles having one or more hydrostatic transmissions operably coupled to the drive members.

Such vehicles may include two hydrostatic transmissions. Each of the hydrostatic transmissions may be operably coupled to a drive member located on opposite sides of a vehicle. The vehicle may include a hydraulic circuit, and each of the hydrostatic transmissions may include a hydraulic pump and a hydraulic motor fluidly coupled to the hydraulic circuit. The hydrostatic transmissions transfer torque supplied by a power source, such as, for example, an internal combustion engine, to the drive members. The amount of torque transferred by the hydrostatic transmissions may be controlled by a controller that controls the flow of fluid in the hydraulic circuit and/or in the pumps and motors of the hydrostatic transmissions.

The controller may be configured to, among other things, control a pressure override (POR) system, which substantially prevents over-pressurization in the hydrostatic transmission, for example, by limiting the pressure in the hydrostatic transmissions to either a static (i.e., constant) or dynamic (i.e., varying) pressure set point. For example, the controller, if electronic, may control an electronic pressure override (ePOR) system. If, on the other hand, the controller is hydro-mechanical, it may control a hydro-mechanical pressure override (hPOR) system.

The controller may substantially prevent over-pressurization by controlling fluid flow in the hydrostatic transmissions. For example, if exemplary controller 62 receives signals indicating that a parameter related to pressure (e.g., the pressure) in the hydraulic circuit exceeds the pressure set point, controller 62 may send signals, either electric or hydraulic, to pump and/or motor actuator devices 64 and 66, respectively, so that the output of pumps 26 and/or motors 28 is reduced (e.g., via de-stroking the pumps and/or motors 26 and 28, respectively). In this manner, controller 62 may prevent over-pressurization in the hydrostatic transmissions 22 by limiting the parameter related to pressure to the pressure set point. This may reduce wear on the components of power train 14.

According to some embodiments, the controller may be configured to operate a system for controlling slip of the vehicle's drive members, for example, by controlling the fluid flow in the transmissions. For example, the controller may operate such that the pressure set point is dynamic. Limiting the parameter related to pressure in the transmissions to a static pressure set point may result in reducing the torque transferred to the drive members, such that the performance of the vehicle is undesirable for some operating conditions. For example, it may be desirable for the transmissions to supply increased torque based on the vehicle's speed, the drive members' speed, and/or whether the vehicle is traveling in a straight-line travel path or a curved travel path.

For example, it may be desirable to transfer more torque to the drive members when the vehicle is traveling at a relatively high rate of speed. Moreover, when the vehicle is traveling in a curved travel path (see, e.g., FIGS. 3A and 3B), it may be desirable to supply more torque to the drive member(s) located on the opposite side of the vehicle from the center of the radius of the travel path of the vehicle. For example, the drive members of the vehicle may include tracks, and steering the vehicle may be executed by supplying more torque to the track or tracks located on the outside of the curved travel path.

As schematically-depicted in FIG. 3A, an operator of vehicle 10 may operate steering device 20 to provide a steering command (e.g., a steering command of about 25% to the left) and, as vehicle 10 executes a turn defining a curved travel path $TP_A$ to the left, the curved travel path $TP_A$ defines a center C and a radius $R_A$. It may be desirable to provide the drive member(s) located on the side of vehicle 10 opposite the center C with more torque than the drive member(s) located on the same side of vehicle 10 as the center C. Moreover, FIG. 3B schematically-depicts a curved travel path $TP_B$ defining a radius $R_B$ that is less than the radius $R_A$ schematically-depicted in FIG. 3A, which may be executed when the operator uses steering device 20 to provide a steering command of, for example, about 75% to the left. As the radius decreases, it may be desirable to further increase the difference between the torque supplied to the drive member(s) located on the outside of the curved travel path and the drive member(s) located on the inside of the curved travel path.

According to some embodiments, the pressure set point may be dynamic such that the vehicle exhibits improved operation. For example, the pressure set point, rather than being the same regardless of the operation of the vehicle, may be increased as the steering command calls for a decreased radius. For example, increasing the steering command (e.g., from 25% to 75%) results in the vehicle traveling in a curved path defining a smaller radius. As the radius decreases, it may be desirable to provide more power and/or force to the drive member(s) located on the outside of the curved travel path and/or a greater difference between the power and/or force supplied to the drive member(s) located on the outside of the curved travel path and the drive member(s) located on the inside of the curved travel path. Moreover, the amount of power and/or force provided to the drive member(s) may be controlled such that the slip of the drive member(s) is limited.

According to some embodiments, the amount of torque supplied to drive members 16 may be controlled by controlling the fluid flow in the hydraulic transmissions 22. For example, the torque supplied to drive members 16 may be controlled by controlling the amount and/or pressure of the fluid supplied by pumps 26 to motors 28, and/or by stroking or de-stoking motors 28. Controller 62 may be configured to control the fluid flow in hydraulic transmissions 22 based on the signal indicative of a parameter related to pressure. For example, controller 62 may control fluid flow such that the pressure in hydraulic circuit 36 does not exceed the pressure set point.

Figure 4A:
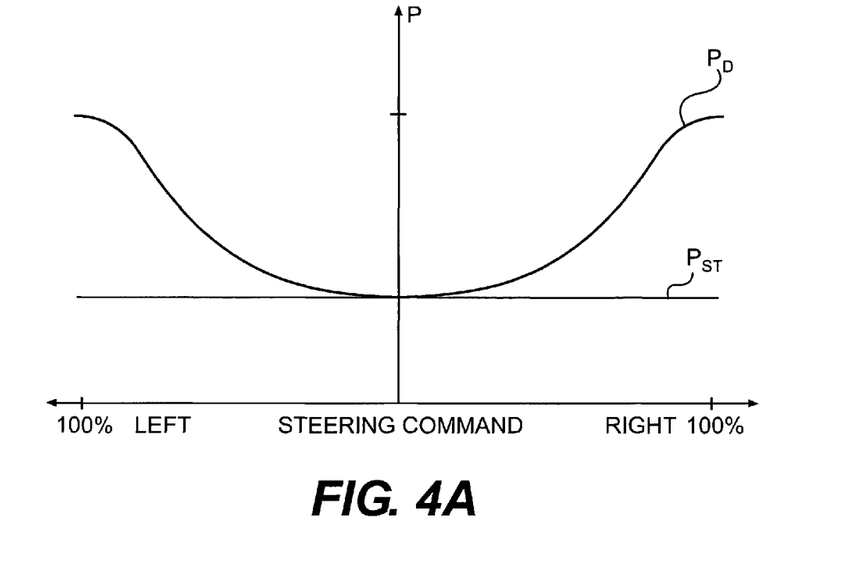
FIG. 4A is a graphical representation of an exemplary relationship between steering command and pressure in an exemplary vehicle transmission.
Figure 4B:
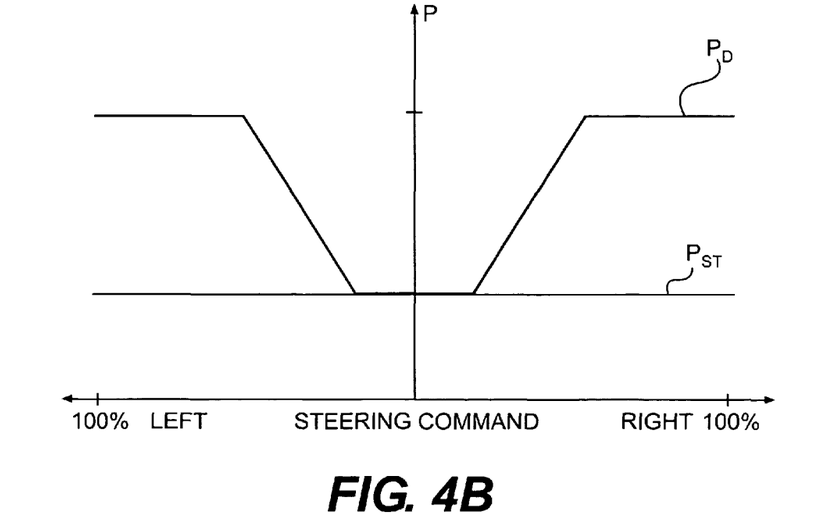
FIG. 4B is a graphical representation of another exemplary relationship between steering command and pressure in an exemplary vehicle transmission.

Referring to FIGS. 4A and 4B, for example, controller 62 may control fluid flow through hydraulic circuit 36 such that pressure in hydraulic circuit 36 does not exceed a static pressure set point $P_{ST}$, as shown in FIGS. 4A and 4B. The static pressure set point may be predetermined and/or may be operator adjustable via an adjustment device of operator interface 18, such that an operator may tailor the torque provided to drive members 16 to the operating conditions. The static pressure set point $P_{ST}$, however, does not vary (except via manual operator adjustment) based on steering command.

According to some embodiments, the pressure set point may vary with steering command. For example, as schematically-depicted in FIGS. 4A and 4B, dynamic pressure set point $P_D$ varies with the steering command. As the steering command increases (to the left or right of straight ahead), thereby causing vehicle 10 to travel in a curved travel path having a smaller radius, the pressure set point (i.e., the maximum pressure in hydraulic circuit 36) increases, which permits motor 28 associated with a drive member 16 located on the outside of the turn to supply more torque to the drive member 16 located on the outside of the turn, for example, by increasing motor 28's stroke. Thus, as the steering command increases, more torque is permitted to be supplied to drive members 16 based on the increase in the dynamic pressure set point.

FIG. 4A shows an exemplary profile for the dynamic pressure set point $P_D$ controlled by an exemplary electronic embodiment of controller 62. According to some embodiments, controller 62 may control the fluid flow in one or more of transmissions 22 based on signals indicative of a steering command received from steering device 20 and/or a signal indicative of a parameter related to pressure received from sensor 52 and/or sensor 54. For example, controller 62 may include one or more memory devices for storing data, for example, in the form of one or more maps or tables, which correlate values associated with steering commands, values associated with the parameter related to pressure, values associated with vehicle 10's speed, values associated with a speed command, and/or values associated with fluid flow in transmissions 22. Controller 62 may operate to determine appropriate fluid flow in transmissions 22 based these values and one or more of the maps or tables and provide a signal to one or more of pump and motor actuator devices 64 and 66, respectively, such that fluid flows in transmissions 22 according to the determined fluid flow. For example, controller 62 may operate such that the values of the maps or tables result in a dynamic pressure set point $P_D$ having the exemplary profile schematically-depicted in FIG. 4A. In this exemplary manner, controller 62 may operate to control the amount of torque supplied to drive members 16.

According to some embodiments, controller 62 may include a processor configured to control fluid flow in one or more of transmissions 22 based on a mathematical relationship between, for example, a value corresponding to the signal indicative of a steering command and a value corresponding to the signal indicative of a parameter related to pressure in transmissions 22. According to such embodiments, the fluid flow in one or more of transmissions 22 may be controlled via real time calculations rather than, or in addition to, relying on values stored in maps or tables. Such exemplary embodiments of controller 62 may operate such that the dynamic pressure set point $P_D$ exhibits the exemplary profile schematically-depicted in FIG. 4A.

FIG. 4B shows an exemplary profile for a dynamic pressure set point $P_D$ set by an exemplary hydro-mechanical embodiment of controller 62. Exemplary hydro-mechanical controller 62 may control pressure in hydraulic circuit 36 by sending a hydraulic signal to pump and/or motor actuator devices 64 and 66, respectively, which control the stroke of pumps 26 and/or motors 28. For example, during straight-line travel (i.e., corresponding to 0% steering command), controller 62 may operate to limit pressure in hydraulic circuit 36 to a static pressure set point $P_{ST}$ by de-stroking the pumps 26 and/or the motors 28.

According to some embodiments, the static pressure set point controlled by the exemplary hydro-mechanical controller 62 may be modified so that it operates like a dynamic pressure set point. For example, steering device 20 may include one or more valves configured to send a hydraulic signal to controller 62 in the form of pressurized hydraulic fluid. The controller 62 may be configured, for example, to reduce the hydraulic signals sent from controller 62 to pump and/or motor actuator devices 64 and 66, which serve to de-stroke the pumps 26 and/or motors 28, respectively, and set the pressure in the hydraulic circuit 36 to the static pressure set point $P_{ST}$. This reduction may occur via reduction of the pressure of the hydraulic signal based on the hydraulic signal sent from steering device 20 to controller 62. In this manner, the amount of de-stroking of pumps 26 and/or motors 28 serves to allow the pressure set point to increase and become dynamic, as schematically-depicted in FIG. 4B. In particular, as the steering device 20 is moved to increase the steering command, the valve(s) associated with the steering device 20 allow more fluid to flow under pressure to controller 62. Controller 62 uses the fluid flow from steering device 20 to increase the amount of pressure permitted in hydraulic circuit 36 by, for example, counteracting the de-stroking hydraulic signal sent to pump and/or motor actuator devices 64 and 66. As a result, the pressure set point becomes dynamic and based, at least in part, on the signal indicative of a steering command. This may result in a dynamic pressure set point $P_D$ having the exemplary profile shown in FIG. 4B.

According to some embodiments, the pressure set point, regardless of whether the pressure set point is static or dynamic, may be modified by the operator via an adjustment provided by operator interface 18. For example, an operator may adjust the pressure set point based on experience and/or operating conditions. Thus, the pressure set point profiles shown in FIGS. 4A and 4B are schematic and exemplary. For example, the exemplary profiles shown in FIGS. 4A and 4B may not necessarily be symmetric with respect to steering command. Further, the exemplary profile shown in FIG. 4A may not necessarily be curvilinear, and the exemplary profile shown in FIG. 4B may not necessarily be a combination of linear portions. For example, the profiles may be a combination of linear portions and curvilinear portions.

It will be apparent to those skilled in the art that various modifications and variations can be made to the disclosed systems and methods. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A system for controlling slip of vehicle drive members, the system comprising:
    a power train including
        a plurality of drive members, and
        a hydraulic transmission configured to supply torque to at least one of the drive members,
            wherein a magnitude of the torque is related to fluid flow in the hydraulic transmission; and
    a controller in communication with the hydraulic transmission to control the fluid flow in the hydraulic transmission,
    wherein the controller controls slip of the at least one drive member based on a signal indicative of a steering command and a signal indicative of a parameter related to pressure, wherein the controller limits a pressure of the hydraulic transmission at or below a dynamic pressure set point determined from the signal indicative of the steering command and the signal indicative of the parameter related to pressure.

2. The system of claim 1, wherein the controller controls the fluid flow in the hydraulic transmission such that a first magnitude of torque is supplied to the at least one drive member when the signal indicative of a steering command corresponds to a substantially straight line travel path of the vehicle, and wherein the controller is configured to control the fluid flow in the hydraulic transmission such that a second magnitude of torque is supplied to the at least one drive member when the signal indicative of a steering command corresponds to a curved travel path of the vehicle.

3. The system of claim 2, wherein the curved travel path of the vehicle defines a turning radius, and wherein as the turning radius decreases, the second magnitude increases, such that more torque is supplied to the at least one drive member.

4. The system of claim 2, wherein the first magnitude is limited such that the at least one drive member does not slip with respect to the ground during the substantially straight-line travel path of the vehicle.

5. The system of claim 1, wherein the hydraulic transmission includes a hydraulic pump fluidly coupled to a hydraulic motor.

6. The system of claim 5, wherein at least one of the hydraulic pump and the hydraulic motor is configured to vary displacement.

7. The system of claim 1, wherein the controller includes an electronic controller.

8. The system of claim 1, wherein the controller includes a hydro-mechanical controller.

9. The system of claim 1, wherein the drive members include ground engaging tracks.

10. The system of claim 1, wherein the drive members include wheels.

11. The system of claim 1, wherein the controller is stores a plurality of values corresponding to the parameter related to pressure and a plurality of values for the steering commands that correspond to the plurality of values corresponding to the parameter related to pressure.

12. The system of claim 1 wherein the parameter related to pressure includes pressure in the hydraulic transmission.

13. A vehicle comprising:
    a power train including:
        a power source,
        a plurality of drive members, and
        a hydraulic transmission operably coupling the plurality of drive members to the power source and configured to supply torque to at least one of the drive members,
            wherein a magnitude of the torque is related to fluid flow in the hydraulic transmission; and
    a controller in communication with the hydraulic transmission to control the fluid flow in the hydraulic transmission,
    wherein the controller controls slip of the at least one drive member based on a signal indicative of a steering command and a signal indicative of a parameter related to pressure, wherein the controller limits a pressure of the hydraulic transmission at or below a dynamic pressure set point determined from the signal indicative of the steering command and the signal indicative of the parameter related to pressure.

14. The vehicle of claim 13, wherein the controller controls the fluid flow in the hydraulic transmission such that a first magnitude of torque is supplied to the at least one drive member when the signal indicative of a steering command corresponds to a substantially straight line travel path of the vehicle, and wherein the controller is configured to control the fluid flow in the hydraulic transmission such that a second magnitude of torque is supplied to the at least one drive member when the signal indicative of a steering command corresponds to a curved travel path of the vehicle.

15. The vehicle of claim 14, wherein the curved travel path of the vehicle defines a turning radius, and wherein as the turning radius decreases, the second magnitude increases, such that more torque is supplied to the at least one drive member.

16. The vehicle of claim 13, wherein the controller stores a plurality of values corresponding to the parameter related to pressure and a plurality of values for the steering commands that correspond to the plurality of values corresponding to the parameter related to pressure, and wherein the controller is configured to receive the signal indicative of a steering command and control slip of the at least one drive member controls slip of the at least one drive member based on a value corresponding to the parameter related to pressure that corresponds to the value for the steering commands.

17. A method for limiting slip of drive members of a vehicle, the method comprising:
    receiving a signal indicative of a parameter related to pressure in a transmission of the vehicle;
    receiving a signal indicative of a steering command of the vehicle; and
    controlling fluid flow in the transmission based on the signal indicative of a parameter related to pressure in the transmission and the signal indicative of a steering command, such that the slip of at least one of the drive members is limited,
    wherein controlling fluid flow in the transmission further includes determining a dynamic pressure set point from the signal indicative of the steering command and the signal indicative of the parameter related to pressure, wherein the dynamic pressure set point varies with the signal indicative of the steering command, and wherein controlling fluid flow in the transmission further includes limiting a pressure of the hydraulic transmission at or below the dynamic pressure set point.

18. The method of claim 17, wherein controlling fluid flow in the transmission includes controlling the fluid flow such that a first magnitude of torque is supplied to the at least one drive member when the signal indicative of a steering command corresponds to a substantially straight-line travel path of the vehicle, and controlling fluid flow such that a second magnitude of torque is supplied to the at least one drive member when the signal indicative of a steering command corresponds to a curved travel path of the vehicle, and wherein the second magnitude is greater than the first magnitude.

19. The system of claim 1, wherein the dynamic pressure set point varies with the steering command.

20. The vehicle of claim 13, wherein the dynamic pressure set point varies with the steering command.

* * * * *